United States Patent
Faivishevsky et al.

(10) Patent No.: US 10,963,783 B2
(45) Date of Patent: Mar. 30, 2021

(54) TECHNOLOGIES FOR OPTIMIZED MACHINE LEARNING TRAINING

(71) Applicant: INTEL CORPORATION, Santa Clara, CA (US)

(72) Inventors: Lev Faivishevsky, Kfar Saba (IL); Amitai Armon, Tel-Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 786 days.

(21) Appl. No.: 15/436,841

(22) Filed: Feb. 19, 2017

(65) Prior Publication Data
US 2018/0240010 A1    Aug. 23, 2018

(51) Int. Cl.
G06N 3/08    (2006.01)
G06N 3/04    (2006.01)

(52) U.S. Cl.
CPC .............. G06N 3/08 (2013.01); G06N 3/0445 (2013.01); G06N 3/0454 (2013.01)

(58) Field of Classification Search
CPC ................................ G06N 3/08; G06N 3/0445
See application file for complete search history.

(56) References Cited

U.S. PATENT DOCUMENTS

| | | | | |
|---|---|---|---|---|
| 10,387,888 | B2 * | 8/2019 | Sapoznik | G06F 16/2237 |
| 2015/0161987 | A1 * | 6/2015 | Horesh | G10L 15/063 |
| | | | | 704/232 |
| 2016/0099010 | A1 * | 4/2016 | Sainath | G10L 25/30 |
| | | | | 704/232 |
| 2017/0060844 | A1 * | 3/2017 | He | G06F 16/3329 |
| 2017/0091615 | A1 * | 3/2017 | Liu | G06N 3/0445 |
| 2017/0228645 | A1 * | 8/2017 | Wang | G06N 3/04 |

(Continued)

OTHER PUBLICATIONS

Phua et al, "Parallel nonlinear optimization techniques for training neural networks", 2003, IEEE Transactions on Neural Networks, 14, 6, pp. 1460-1468. (Year: 2003).*

(Continued)

*Primary Examiner* — Alexey Shmatov
*Assistant Examiner* — Clint Mullinax
(74) *Attorney, Agent, or Firm* — Hanley, Flight & Zimmerman, LLC

(57) ABSTRACT

Technologies for optimization of machine learning training include a computing device to train a machine learning network with a training algorithm that is configured with configuration parameters. The computing device may perform many training instances in parallel. The computing device captures a time series of partial accuracy values from the training. Each partial accuracy value is indicative of machine learning network accuracy at an associated training iteration. The computing device inputs the configuration parameters to a feed-forward neural network to generate a representation and inputs the representation to a recurrent neural network. The computing device trains the feed-forward neural network and the recurrent neural network against the partial accuracy values. The computing device optimizes the feed-forward neural network and the recurrent neural network to determine optimized configuration parameters. The optimized configuration parameters may minimize training time to achieve a predetermined accuracy level. Other embodiments are described and claimed.

22 Claims, 3 Drawing Sheets

(56) References Cited

U.S. PATENT DOCUMENTS

2017/0304732 A1* 10/2017 Velic .................. G06K 9/00201
2017/0337464 A1* 11/2017 Rabinowitz .......... G06N 3/0454
2017/0337478 A1* 11/2017 Sarikaya ................. G06F 3/167
2018/0046894 A1*  2/2018 Yao ......................... G06F 7/483

OTHER PUBLICATIONS

Ilonen et al, "Differential Evolution Training Algorithm for Feed-Forward Neural Networks", 2003, Neural Processing Letters, 17, pp. 93-105. (Year: 2003).*
Bandurski et al, "A Lamarckian Hybrid if Differential Evolution and Conjugate Gradients for Neural Network Training", 2010, Neural Processing Letters, 32, pp. 31-44. (Year: 2010).*
Wistuba et al, "Two-Stage Transfer Surrogate Model for Automatic Hyperparameter Optimization", 2016, Lecture notes in Computer Science, Machine Learning and Knowledge Discovery, vol. 9851, pp. 1-16. (Year: 2016).*

* cited by examiner

TECHNOLOGIES FOR OPTIMIZED MACHINE LEARNING TRAINING

BACKGROUND

Modern machine learning algorithms such as convolutional neural networks or other deep learning algorithms typically require involved training processes, which can be computationally hard. Machine learning training can be tuned with a number of configuration parameters in order to achieve optimum accuracy of the underlying machine learning algorithm. Tuning the configuration parameters typically requires executing the entire training process repeatedly and is thus computationally expensive.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
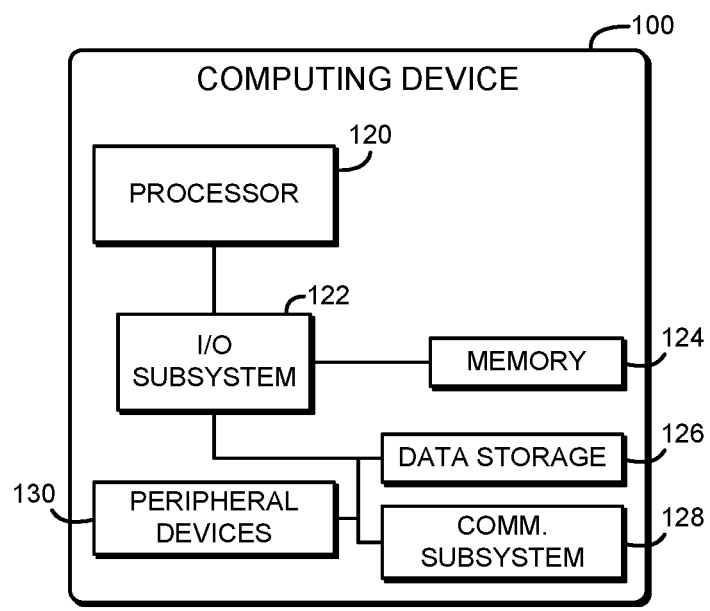
FIG. 1 is a simplified block diagram of at least one embodiment of a computing device for optimized machine learning training.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for optimized machine learning training is shown. In use, as described below, the computing device 100 trains a machine learning network using a training algorithm that is configured with a set of one or more configuration parameters. The computing device 100 captures a time series of partial accuracy values during training. The computing device 100 may execute many instances of the training algorithm in parallel, with each instance configured with a different set of configuration parameters. The configuration parameters are input into a model that includes a deep neural network and a recurrent neural network, and the model is trained against the captured time series of partial accuracy values. After training, the model may be optimized to determine a set of optimized configuration parameters that minimize the training time required to achieve a predetermined accuracy level. The optimized configuration parameters may be used to train the machine learning model. By modeling the behavior of training the machine learning network and optimizing using the model, the computing device 100 may improve or otherwise tune the training configuration parameters with significantly reduced computational complexity as compared to tuning the configuration parameters using the underlying machine learning algorithm. For example, one potential embodiment of the computing device 100 achieved a 10% speedup in training for GoogLeNet using the ImageNet training database as compared to typical multimode training, while maintaining equivalent accuracy. Additionally, the computing device 100 may model the training behavior of the machine learning algorithm with high accuracy. For example, one potential embodiment of the computing device 100 modeled accuracy time series for the AlexNet algorithm with a 0.08 RMSE error. Additionally, the computing device 100 may be able to take advantage of increased parallelism and improve scaling out as compared to conventional configuration parameter tuning.

The computing device 100 may be embodied as any type of device capable of predictable dynamic address assignment and otherwise performing the functions described herein. For example, the computing device 100 may be embodied as, without limitation, a computer, a server, a workstation, a laptop computer, a tablet computer, a notebook computer, a mobile computing device, a smartphone, a wearable computing device, a multiprocessor system, and/or a consumer electronic device. As shown in FIG. 1, the illustrative computing device 100 includes a processor 120, an I/O subsystem 122, a memory 124, and a data storage device 126. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 128, which may be embodied as any communication circuit, device, or collection thereof, capable of enabling communications between the computing device 100 and other remote devices over a computer network (not shown). The communications subsystem 128 may be configured to use any one or more communication technology (e.g., wired or wireless communications) and associated protocols (e.g., Ethernet, Bluetooth®, WiMAX, 3G, 4G LTE, etc.) to effect such communication.

As shown, the computing device 100 may further include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

Figure 2:
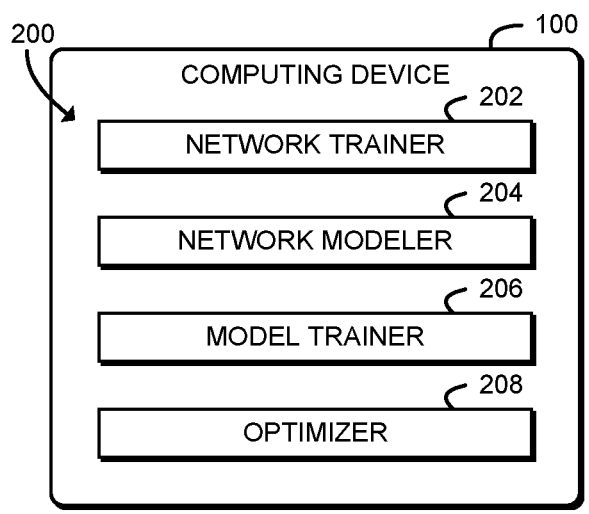
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes a network trainer 202, a network modeler 204, a model trainer 206, and an optimizer 208. The various components of the environment 200 may be embodied as hardware, firmware, software, or a combination thereof. As such, in some embodiments, one or more of the components of the environment 200 may be embodied as circuitry or collection of electrical devices (e.g., network trainer circuitry 202, network modeler circuitry 204, model trainer circuitry 206, and/or optimizer circuitry 208). It should be appreciated that, in such embodiments, one or more of the network trainer circuitry 202, the network modeler circuitry 204, the model trainer circuitry 206, and/or the optimizer circuitry 208 may form a portion of the processor 120, the I/O subsystem 122, and/or other components of the computing device 100. Additionally, in some embodiments, one or more of the illustrative components may form a portion of another component and/or one or more of the illustrative components may be independent of one another.

The network trainer 202 is configured to train a machine learning network with a training algorithm. The machine learning network may be embodied as, for example, a convolutional neural network. The training algorithm is configured with one or more configuration parameters. The network trainer 202 is further configured to capture a time series of partial accuracy values in response to training the machine learning network. Each partial accuracy value is indicative of machine learning network accuracy at an associated training iteration. The network trainer 202 may be further configured to train the machine learning network with multiple, parallel instances of the training algorithm. Each parallel instance of the training algorithm is configured with a different set of one or more configuration parameters. The network trainer 202 may be further configured to capture a time series of partial accuracy values for each parallel instance of the training algorithm. In some embodiments, the network trainer 202 may be further configured to train the machine learning network with the training algorithm in parallel by a plurality of distributed computing nodes. The training algorithm of each computing node is configured with a different set of one or more configuration parameters.

The network modeler 204 is configured to input the one or more configuration parameters to a feed-forward neural network to generate a representation of the configuration parameters. The feed-forward neural network may be embodied as a deep neural network including multiple fully connected layers. The network modeler 204 is further configured to input the representation of the configuration parameters to a recurrent neural network. The recurrent neural network may be embodied as a long short time memory network. The model trainer 206 is configured to train the recurrent neural network and the feed-forward neural network against the time series of partial accuracy values.

The optimizer 208 is configured to optimize the recurrent neural network and the feed-forward neural network to determine one or more optimized configuration parameters. The optimizer 208 optimizes the recurrent neural network and the feed-forward neural network in response to training the recurrent neural network and the feed-forward neural network. Optimizing the recurrent neural network and the feed-forward neural network may include determining one or more optimized configuration parameters to minimize training time to achieve a predetermined accuracy level. In some embodiments, the optimizer 208 may be configured to optimize the recurrent neural network and the feed-forward neural network with a BFGS algorithm. The network trainer 202 may be further configured to train the machine learning network with the training algorithm configured with the one or more optimized configuration parameters.

Figure 3:
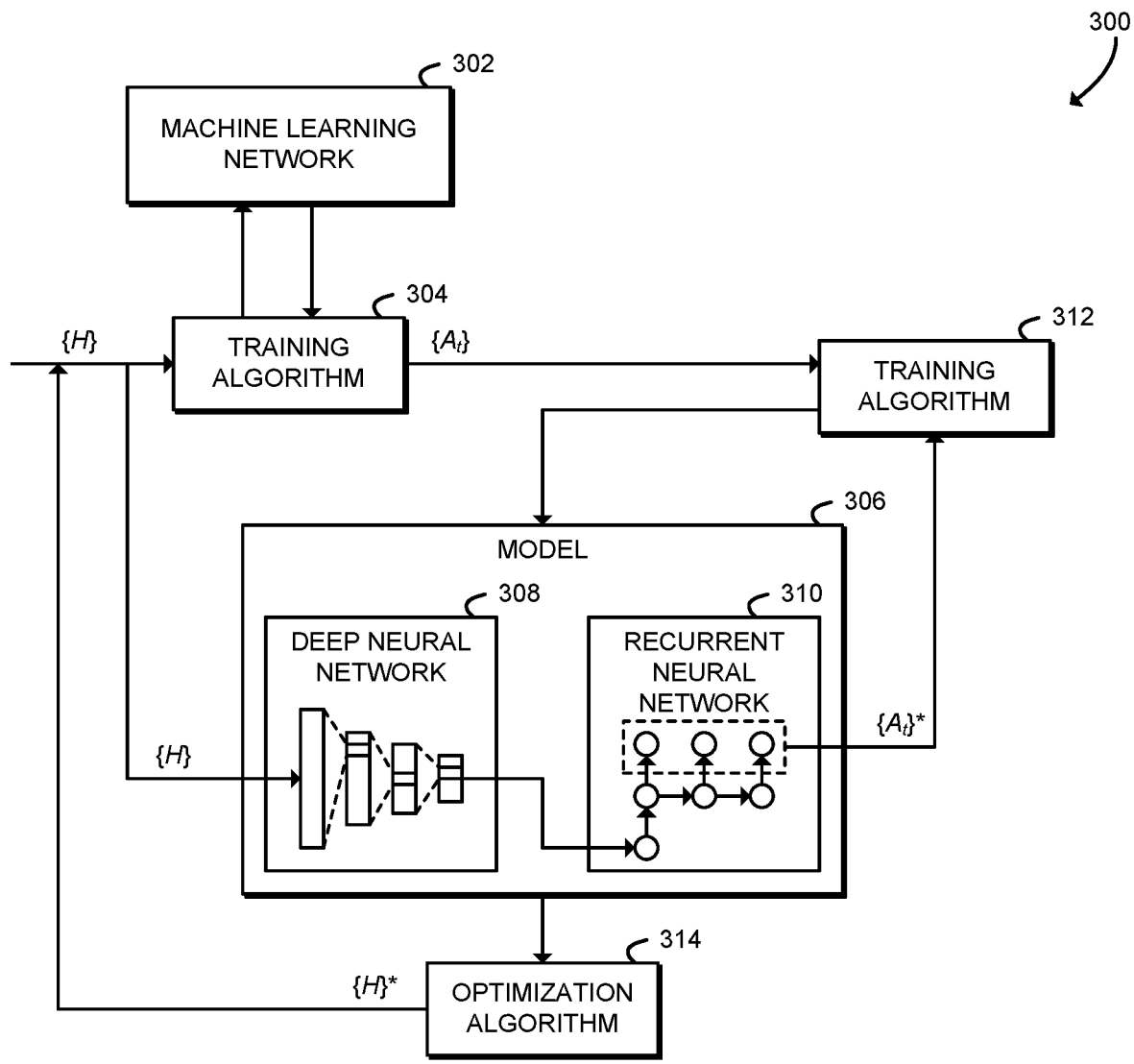
FIG. 3 is a simplified block diagram of at least one embodiment of a neural network topology that may be established by the computing device of FIGS. 1 and 2.

Referring now to FIG. 3, in use, the computing device 100 may establish a neural network topology as shown in diagram 300. As shown, the computing device 100 establishes an underlying machine learning network 302. For example, the machine learning network 302 may be embodied as a deep convolutional neural network for image classification such as AlexNet or GoogLeNet, or as another deep learning algorithm. As shown, the machine learning network 302 is trained by a training algorithm 304. The training algorithm 304 may be configured with multiple configuration parameters $\{H_1, H_2, H_3, \ldots\}$, also called hyperparameters. The training algorithm 304 performs a sequence of training iterations with the machine learning network 302 and produces an associated sequence of partial accuracy values $\{A_1, A_2, A_3, \ldots, A_t\}$. Each partial accuracy value $A_t$ corresponds to accuracy of the machine learning network 302 at a training iteration t.

As shown, the configuration parameters (H) are input to a model 306, which includes a deep neural network (DNN) 308 and a recurrent neural network (RNN) 310. The DNN 308 is a feed-forward neural network, and is illustratively embodied as a deep neural network with multiple fully connected (FC) layers. The RNN 310 is illustratively a long short time memory (LSTM) RNN, which may be used to model a sequence of values. As shown, the configuration parameters {H} are input into the DNN 308 to generate a representation. That representation is, in turn, injected into the RNN 310. A training algorithm 312 trains the model 306 against the time series of partial accuracy values $\{A_1\}$. After training, the RNN 310 produces a modeled time series $\{A_t\}^*$. An optimization algorithm 314 may optimize the model 306 after training to generate optimized configuration parameters $\{H\}^*$. As shown, the optimized configuration parameters $\{H\}^*$ may be used by the training algorithm 304 to continue to train the machine learning network 302. The machine learning network 302 may be trained, for example, for production use or may be trained to generate additional partial accuracy values $\{A_1, A_2, A_3, \ldots, A_t\}$ for additional training optimization.

Figure 4:
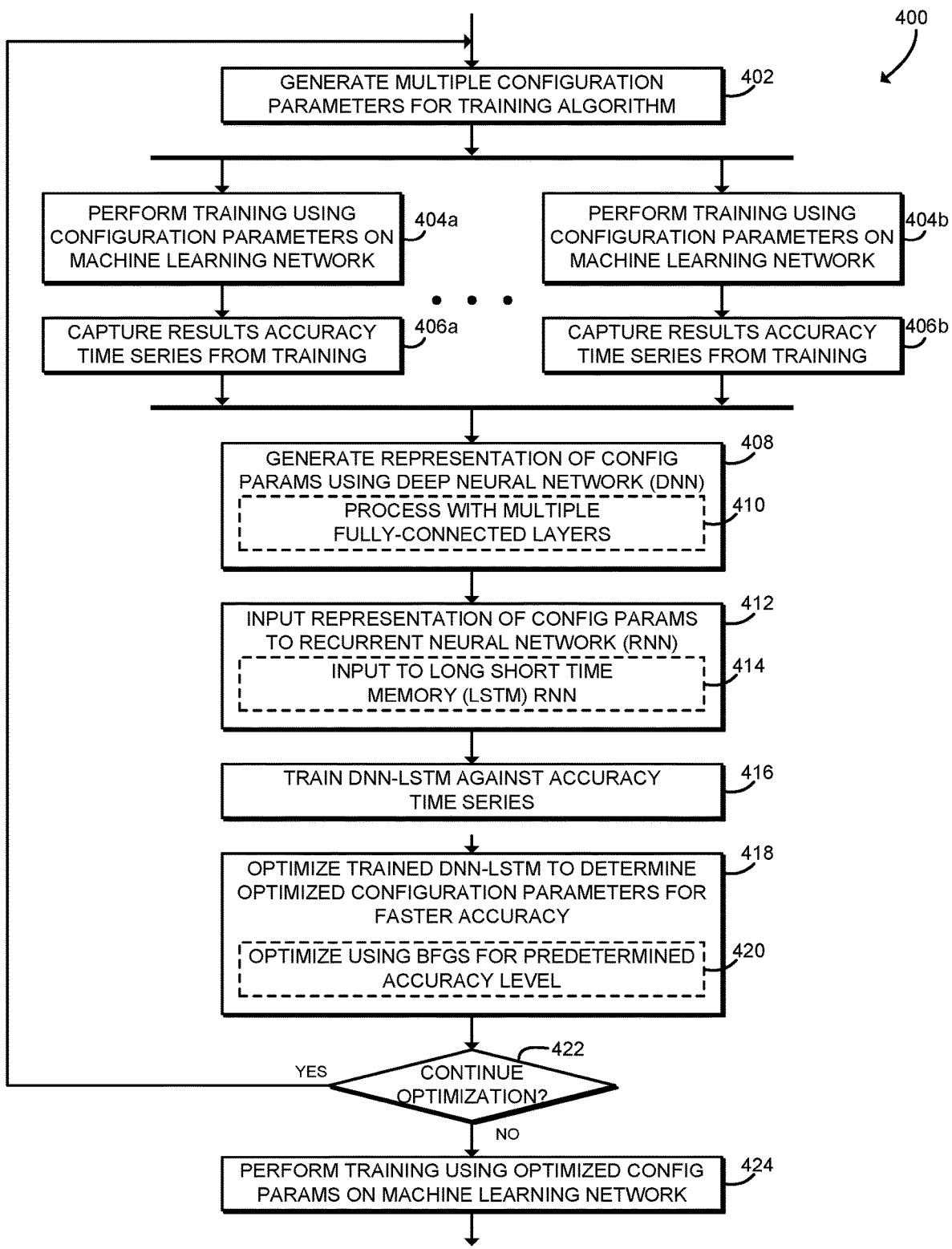
FIG. 4 is a simplified flow diagram of at least one embodiment of a method for optimized machine learning training that may be executed by the computing device of FIGS. 1 and 2.

Referring now to FIG. 4, in use, the computing device 100 may execute a method 400 for optimized machine learning training. It should be appreciated that, in some embodiments, the operations of the method 400 may be performed by one or more components of the environment 200 of the computing device 100 as shown in FIG. 2. The method 400 begins in block 402, in which the computing device 100 generates multiple configuration parameters $\{H_1, H_2, H_3, \ldots\}$ for the training algorithm 304. The training algorithm 304 may be embodied as any training algorithm usable for training the machine learning network 302, such as a gradient descent, stochastic gradient descent, or other gradient-based training algorithm. The configuration parameters H thus may include any parameter to tune or otherwise configure the operation of the training algorithm 304, such as a loss function, an update rule, a number of epochs, a batch size, a learning rate, a learning rate decay, or other configuration parameters.

The computing device 100 may use any appropriate technique to generate the configuration parameters {H}. For example, the configuration parameters {H} may be generated randomly or may be based on predetermined initial configuration parameters. As described further below, the configuration parameters {H} may include and/or be based on optimized configuration parameters $\{H\}^*$ previously determined by the computing device 100. In some embodiments, the computing device 100 may generate many different sets of configuration parameters {H} for training in parallel, as described further below.

After generating the configuration parameters {H}, the method 400 proceeds in parallel to multiple instances of block 404. Although illustrated as executing blocks 404a, 404b in parallel, it should be understood that in some embodiments the method 400 may proceed in parallel to many more instances (e.g., hundreds of instances) of block 404. The blocks 404 may be executed in parallel by the computing device 100 or by many computing devices 100, for example by many distributed computing nodes executing in a distributed computing system.

In block 404, the computing device 100 performs training using the configuration parameters {H} on the machine learning network 302. The computing device 100 executes multiple training iterations using the training algorithm 304. For each training iteration t, the computing device 100 generates a partial accuracy value $A_t$, indicating the accuracy of the underlying machine learning network 302 at that training iteration t. The computing device 100 may perform the training algorithm 304 in parallel using conventional parallel training techniques, which may scale out to hundreds of instances. Because each parallel instance of the block 404 may perform parallel training, the method 400 may thus support scaling to many (e.g., thousands or millions) of instances and/or computing nodes. In block 406, the computing device 100 captures a time series of partial accuracy values $\{A_1, A_2, A_3, \ldots, A_t\}$. The time series of partial accuracy values A, are indicative of the convergence of the machine learning network 302 toward accurate results achieved using the configuration parameters {H}. Because each set of configuration parameters H is independent, each instance of the blocks 404, 406 may be executed independently to generate an independent time series $\{A_1, A_2, A_3, \ldots, A_t\}$. As describe further below, all of those time series may be used to train the model 306.

After generating and capturing multiple time series $\{A_1, A_2, A_3, \ldots, A_t\}$ in parallel, the method 400 advances to block 408. In block 408, the computing device 100 generates a representation of the configuration parameters {H} using the deep neural network (DNN) 308. The dependency between configuration parameters {H} and partial accuracy values $\{A_t\}$ is highly nonlinear. Therefore, processing the configuration parameters {H} with the DNN 308 may generate an optimal representation of the configuration parameters {H}. In some embodiments, in block 410 the configuration parameters {H} may be processed with multiple fully connected (FC) layers. In the illustrative embodiment, the DNN 308 includes five FC layers, including four hidden layers with dimensions of 50, 25, 15, and five and a projection layer of size 10. Each FC layer may use ReLu activations.

In block 412, the computing device 100 inputs the representation of the configuration parameters {H} from the DNN 308 to a recurrent neural network (RNN) 310. The RNN 310 includes internal memory and thus may be used to model sequences of input. In some embodiments, in block 414, the RNN 310 may be embodied as a long short time memory (LSTM). In the illustrative embodiment, the RNN 310 is an LSTM with a hidden size of 10 and a cell size of 10.

In block 416, the computing device 100 trains the model 306 against the partial accuracy time series $\{A_1, A_2, A_3, \ldots, A_t\}$. Training allows the model 306 to describe and/or predict the convergence of the machine learning network 302 for the associated configuration parameters {H}. The model 306 is trained with the training algorithm 312, which may be embodied as any training algorithm usable for training the model 306, such as a gradient descent, stochastic gradient descent, or other gradient-based training algorithm. In the illustrative embodiment, the training algorithm 312 uses the $L_2$ loss function, the adaptive moment estimation (Adam) update rule, 500 epochs, a batch size of 30, a learning rate of 4e-3, and a learning rate decay of 0.995.

In block 418, the computing device 100 optimizes the trained model 306 to determine optimized configuration parameters $\{H\}^*$. The optimized configuration parameters $\{H\}^*$ may be embodied as a set of configuration parameters $\{H_1, H_2, H_3, \ldots\}$ that minimize the time t (i.e., the number of training iterations) required to achieve a predetermined accuracy $A_t = A_{fixed}$. The computing device 100 may optimize the trained model 306 using a gradient-based optimization method. In some embodiments, in block 420 the computing device 100 may optimize the model 306 using a BFGS optimization algorithm. For example, the computing device 100 may execute a limited memory BFGS algorithm as described in Richard Byrd et al., *A Limited Memory Algorithm for Bound Constrained Optimization,* 16 SIAM J. on Sci. Computing 1190 (1995).

In block 422, the computing device 100 determines whether to continue optimizing training of the machine learning network 302. The computing device 100 may determine, for example, to continue training for a predetermined number of iterations, for a predetermined amount of time, until a predetermine performance of the training algorithm 304 is achieved, or for any other criteria. If the computing device 100 determines to continue optimizing training of the machine learning network 302, the method 400 loops back to block 402 to generate additional partial accuracy time series $\{A_t\}$ using the optimized configuration parameters $\{H\}^*$. As the computing device 100 continues to analyze additional partial accuracy time series $\{A_t\}$, the computing device 100 may generate improved optimized configuration parameters $\{H\}^*$ that provide better training performance. If the computing device 100 determines not to continue optimization, the method 400 advances to block 424.

In block 424, the computing device 100 performs training using the optimized configuration parameters $\{H\}^*$ on the machine learning network 302. Performing training with the optimized configuration parameters $\{H\}^*$ may allow the training algorithm 304 to converge more quickly and/or allow the machine learning network 302 to produce more accurate results. After performing training, the method 400 is completed, and the trained machine-learning network 302 may be used in production or otherwise executed. Of course, the method 400 may be executed multiple times to further optimize configuration parameters and perform additional training.

It should be appreciated that, in some embodiments, the method 400 may be embodied as various instructions stored on a computer-readable media, which may be executed by the processor 120, the I/O subsystem 122, and/or other components of the computing device 100 to cause the computing device 100 to perform the method 400. The computer-readable media may be embodied as any type of media capable of being read by the computing device 100 including, but not limited to, the memory 124, the data storage device 126, firmware devices, other memory or data storage devices of the computing device 100, portable media readable by a peripheral device 130 of the computing device 100, and/or other media.

EXAMPLES

Illustrative examples of the technologies disclosed herein are provided below. An embodiment of the technologies may include any one or more, and any combination of, the examples described below.

Example 1 includes a computing device for optimization of machine learning training, the computing device comprising: a network trainer to (i) train a machine learning network with a training algorithm, wherein the training algorithm is configured with one or more configuration parameters, and (ii) capture a time series of partial accuracy values in response to training of the machine learning network, wherein each partial accuracy value is indicative of machine learning network accuracy at an associated training iteration; a network modeler to (i) input the one or more configuration parameters to a feed-forward neural network to generate a representation of the configuration parameters, and (ii) input the representation of the configuration parameters to a recurrent neural network; a model trainer to train the recurrent neural network and the feed-forward neural network against the time series of partial accuracy values; and an optimizer to, in response to training of the recurrent neural network and the feed-forward neural network, optimize the recurrent neural network and the feed-forward neural network to determine one or more optimized configuration parameters.

Example 2 includes the subject matter of Example 1, and wherein the machine learning network comprises a convolutional neural network.

Example 3 includes the subject matter of any of Examples 1 and 2, and wherein to optimize the recurrent neural network and the feed-forward neural network comprises to determine the one or more optimized configuration parameters to minimize training time to achieve a predetermined accuracy level.

Example 4 includes the subject matter of any of Examples 1-3, and wherein to optimize the recurrent neural network and the feed-forward neural network comprises to optimize the recurrent neural network and the feed-forward neural network with a BFGS algorithm.

Example 5 includes the subject matter of any of Examples 1-4, and wherein the network trainer is further to train the machine learning network with a plurality of parallel instances of the training algorithm, wherein each parallel instance of the training algorithm is configured with a different set of one or more configuration parameters.

Example 6 includes the subject matter of any of Examples 1-5, and wherein the network trainer is further to capture a time series of partial accuracy values for each parallel instance of the training algorithm.

Example 7 includes the subject matter of any of Examples 1-6, and wherein the network trainer is further to train the machine learning network with the training algorithm in parallel by a plurality of distributed computing nodes, wherein the training algorithm of each computing node is configured with a different set of one or more configuration parameters.

Example 8 includes the subject matter of any of Examples 1-7, and wherein the network trainer is further to train the machine learning network with the training algorithm, wherein the training algorithm is configured with the one or more optimized configuration parameters.

Example 9 includes the subject matter of any of Examples 1-8, and wherein the network trainer is further to capture a time series of partial accuracy values in response to training of the machine learning network with the training algorithm configured with the one or more optimized configuration parameters.

Example 10 includes the subject matter of any of Examples 1-9, and wherein the configuration parameters include a learning rate, a learning rate decay, a loss function, a batch size, or a number of epochs.

Example 11 includes the subject matter of any of Examples 1-10, and wherein the feed-forward neural network comprises a deep neural network including a plurality of fully connected layers.

Example 12 includes the subject matter of any of Examples 1-11, and wherein the deep neural network comprises five fully connected layers.

Example 13 includes the subject matter of any of Examples 1-12E, and wherein the recurrent neural network comprises a long short time memory network.

Example 14 includes a method for optimization of machine learning training, the method comprising: training, by a computing device, a machine learning network with a training algorithm, wherein the training algorithm is configured with one or more configuration parameters; capturing, by the computing device, a time series of partial accuracy values in response to training the machine learning network, wherein each partial accuracy value is indicative of machine learning network accuracy at an associated training iteration; inputting, by the computing device, the one or more configuration parameters to a feed-forward neural network to generate a representation of the configuration parameters; inputting, by the computing device, the representation of the configuration parameters to a recurrent neural network; training, by the computing device, the recurrent neural network and the feed-forward neural network against the time series of partial accuracy values; and optimizing, by the computing device in response to training the recurrent neural network and the feed-forward neural network, the recurrent neural network and the feed-forward neural network to determine one or more optimized configuration parameters.

Example 15 includes the subject matter of Examples 14, and wherein the machine learning network comprises a convolutional neural network.

Example 16 includes the subject matter of any of Examples 14 and 15, and wherein optimizing the recurrent neural network and the feed-forward neural network comprises determining the one or more optimized configuration parameters to minimize training time to achieve a predetermined accuracy level.

Example 17 includes the subject matter of any of Examples 14-16, and wherein optimizing the recurrent neural network and the feed-forward neural network comprises optimizing the recurrent neural network and the feed-forward neural network with a BFGS algorithm.

Example 18 includes the subject matter of any of Examples 14-17, and further comprising training, by the computing device, the machine learning network with a plurality of parallel instances of the training algorithm, wherein each parallel instance of the training algorithm is configured with a different set of one or more configuration parameters.

Example 19 includes the subject matter of any of Examples 14-18, and further comprising capturing, by the computing device, a time series of partial accuracy values for each parallel instance of the training algorithm.

Example 20 includes the subject matter of any of Examples 14-19, and further comprising training the machine learning network with the training algorithm in parallel by a plurality of distributed computing nodes, wherein the training algorithm of each computing node is configured with a different set of one or more configuration parameters.

Example 21 includes the subject matter of any of Examples 14-20, and further comprising training, by the computing device, the machine learning network with the training algorithm, wherein the training algorithm is configured with the one or more optimized configuration parameters.

Example 22 includes the subject matter of any of Examples 14-21, and further comprising capturing, by the computing device, a time series of partial accuracy values in response to training the machine learning network with the training algorithm configured with the one or more optimized configuration parameters.

Example 23 includes the subject matter of any of Examples 14-22, and wherein the configuration parameters include a learning rate, a learning rate decay, a loss function, a batch size, or a number of epochs.

Example 24 includes the subject matter of any of Examples 14-23, and wherein the feed-forward neural network comprises a deep neural network including a plurality of fully connected layers.

Example 25 includes the subject matter of any of Examples 14-24, and wherein the deep neural network comprises five fully connected layers.

Example 26 includes the subject matter of any of Examples 14-25, and wherein the recurrent neural network comprises a long short time memory network.

Example 27 includes a computing device comprising: a processor; and a memory having stored therein a plurality of instructions that when executed by the processor cause the computing device to perform the method of any of Examples 14-26.

Example 28 includes one or more machine readable storage media comprising a plurality of instructions stored thereon that in response to being executed result in a computing device performing the method of any of Examples 14-26.

Example 29 includes a computing device comprising means for performing the method of any of Examples 14-26.

Example 30 includes a computing device for optimization of machine learning training, the computing device comprising: means for training a machine learning network with a training algorithm, wherein the training algorithm is configured with one or more configuration parameters; means for capturing a time series of partial accuracy values in response to training the machine learning network, wherein each partial accuracy value is indicative of machine learning network accuracy at an associated training iteration; means for inputting the one or more configuration parameters to a feed-forward neural network to generate a representation of the configuration parameters; means for inputting the representation of the configuration parameters to a recurrent neural network; means for training the recurrent neural network and the feed-forward neural network against the time series of partial accuracy values; and means for optimizing, in response to training the recurrent neural network and the feed-forward neural network, the recurrent neural network and the feed-forward neural network to determine one or more optimized configuration parameters.

Example 31 includes the subject matter of Example 30, and wherein the machine learning network comprises a convolutional neural network.

Example 32 includes the subject matter of any of Examples 30 and 31, and wherein the means for optimizing the recurrent neural network and the feed-forward neural network comprises means for determining the one or more optimized configuration parameters to minimize training time to achieve a predetermined accuracy level.

Example 33 includes the subject matter of any of Examples 30-32, and wherein the means for optimizing the recurrent neural network and the feed-forward neural network comprises means for optimizing the recurrent neural network and the feed-forward neural network with a BFGS algorithm.

Example 34 includes the subject matter of any of Examples 30-33, and further comprising means for training the machine learning network with a plurality of parallel instances of the training algorithm, wherein each parallel instance of the training algorithm is configured with a different set of one or more configuration parameters.

Example 35 includes the subject matter of any of Examples 30-34, and further comprising means for capturing a time series of partial accuracy values for each parallel instance of the training algorithm.

Example 36 includes the subject matter of any of Examples 30-35, and further comprising means for training the machine learning network with the training algorithm in parallel by a plurality of distributed computing nodes, wherein the training algorithm of each computing node is configured with a different set of one or more configuration parameters.

Example 37 includes the subject matter of any of Examples 30-36, and further comprising means for training the machine learning network with the training algorithm, wherein the training algorithm is configured with the one or more optimized configuration parameters.

Example 38 includes the subject matter of any of Examples 30-37, and further comprising means for capturing a time series of partial accuracy values in response to training the machine learning network with the training algorithm configured with the one or more optimized configuration parameters.

Example 39 includes the subject matter of any of Examples 30-38, and wherein the configuration parameters include a learning rate, a learning rate decay, a loss function, a batch size, or a number of epochs.

Example 40 includes the subject matter of any of Examples 30-39, and wherein the feed-forward neural network comprises a deep neural network including a plurality of fully connected layers.

Example 41 includes the subject matter of any of Examples 30-40, and wherein the deep neural network comprises five fully connected layers.

Example 42 includes the subject matter of any of Examples 30-41, and wherein the recurrent neural network comprises a long short time memory network.

The invention claimed is:

1. A computing device for optimization of machine learning training, the computing device comprising:
 a network trainer to (i) train a machine learning network with a training algorithm, wherein the training algorithm is configured with one or more configuration parameters, and (ii) capture a time series of partial accuracy values in response to training of the machine learning network, wherein the time series comprises a plurality of partial accuracy values for a sequence of training iterations performed with the one or more configuration parameters, wherein each partial accuracy value is indicative of machine learning network accuracy at an associated training iteration of the sequence of training iterations;
 a network modeler to (i) input the one or more configuration parameters to a feed-forward neural network to generate a representation of the configuration parameters, and (ii) input the representation of the configuration parameters to a recurrent neural network;
 a model trainer to train the recurrent neural network and the feed-forward neural network against the time series of partial accuracy values to predict partial accuracy values based on configuration parameters of the machine learning network in response to inputting of the one or more configuration parameters; and
 an optimizer to, in response to training of the recurrent neural network and the feed-forward neural network, optimize the recurrent neural network and the feed-forward neural network to determine one or more optimized configuration parameters;
 wherein the network trainer is further to train the machine learning network with the training algorithm in response to optimization of the recurrent neural network and the feed-forward neural network, wherein the training algorithm is configured with the one or more optimized configuration parameters.

2. The computing device of claim 1, wherein the machine learning network comprises a convolutional neural network.

3. The computing device of claim 1, wherein to optimize the recurrent neural network and the feed-forward neural network comprises to determine the one or more optimized configuration parameters to minimize training time to achieve a predetermined accuracy level.

4. The computing device of claim 3, wherein to optimize the recurrent neural network and the feed-forward neural network comprises to optimize the recurrent neural network and the feed-forward neural network with a Broyden-Fletcher-Goldfarb-Shanno (BFGS) algorithm.

5. The computing device of claim 1, wherein the network trainer is further to train the machine learning network with a plurality of parallel instances of the training algorithm, wherein each parallel instance of the training algorithm is configured with a different set of one or more configuration parameters.

6. The computing device of claim 5, wherein the network trainer is further to capture a time series of partial accuracy values for each parallel instance of the training algorithm.

7. The computing device of claim 1, wherein the network trainer is further to train the machine learning network with the training algorithm in parallel by a plurality of distributed computing nodes, wherein the training algorithm of each computing node is configured with a different set of one or more configuration parameters.

8. The computing device of claim 1, wherein the network trainer is further to capture a time series of partial accuracy values in response to training of the machine learning network with the training algorithm configured with the one or more optimized configuration parameters.

9. The computing device of claim 1, wherein the feed-forward neural network comprises a deep neural network including a plurality of fully connected layers.

10. The computing device of claim 1, wherein the recurrent neural network comprises a long short time memory network.

11. A method for optimization of machine learning training, the method comprising:
 training, by a computing device, a machine learning network with a training algorithm, wherein the training algorithm is configured with one or more configuration parameters;

capturing, by the computing device, a time series of partial accuracy values in response to training the machine learning network, wherein the time series comprises a plurality of partial accuracy values for a sequence of training iterations performed with the one or more configuration parameters, wherein each partial accuracy value is indicative of machine learning network accuracy at an associated training iteration of the sequence of training iterations;

inputting, by the computing device, the one or more configuration parameters to a feed-forward neural network to generate a representation of the configuration parameters;

inputting, by the computing device, the representation of the configuration parameters to a recurrent neural network;

training, by the computing device, the recurrent neural network and the feed-forward neural network against the time series of partial accuracy values to predict partial accuracy values based on configuration parameters of the machine learning network in response to inputting the one or more configuration parameters;

optimizing, by the computing device in response to training the recurrent neural network and the feed-forward neural network, the recurrent neural network and the feed-forward neural network to determine one or more optimized configuration parameters; and training, by the computing device, the machine learning network with the training algorithm in response to optimizing the recurrent neural network and the feed-forward neural network, wherein the training algorithm is configured with the one or more optimized configuration parameters.

12. The method of claim 11, wherein optimizing the recurrent neural network and the feed-forward neural network comprises determining the one or more optimized configuration parameters to minimize training time to achieve a predetermined accuracy level.

13. The method of claim 11, further comprising training, by the computing device, the machine learning network with a plurality of parallel instances of the training algorithm, wherein each parallel instance of the training algorithm is configured with a different set of one or more configuration parameters.

14. The method of claim 13, further comprising capturing, by the computing device, a time series of partial accuracy values for each parallel instance of the training algorithm.

15. The method of claim 11, further comprising training the machine learning network with the training algorithm in parallel by a plurality of distributed computing nodes, wherein the training algorithm of each computing node is configured with a different set of one or more configuration parameters.

16. The method of claim 11, further comprising capturing, by the computing device, a time series of partial accuracy values in response to training the machine learning network with the training algorithm configured with the one or more optimized configuration parameters.

17. One or more non-transitory, computer-readable storage media comprising a plurality of instructions that in response to being executed cause a computing device to:

train a machine learning network with a training algorithm, wherein the training algorithm is configured with one or more configuration parameters;

capture a time series of partial accuracy values in response to training the machine learning network, wherein the time series comprises a plurality of partial accuracy values for a sequence of training iterations performed with the one or more configuration parameters, wherein each partial accuracy value is indicative of machine learning network accuracy at an associated training iteration of the sequence of training iterations;

input the one or more configuration parameters to a feed-forward neural network to generate a representation of the configuration parameters;

input the representation of the configuration parameters to a recurrent neural network;

train the recurrent neural network and the feed-forward neural network against the time series of partial accuracy values to predict partial accuracy values based on configuration parameters of the machine learning network in response to inputting the one or more configuration parameters;

optimize, in response to training the recurrent neural network and the feed-forward neural network, the recurrent neural network and the feed-forward neural network to determine one or more optimized configuration parameters; and train the machine learning network with the training algorithm in response to optimizing the recurrent neural network and the feed-forward neural network, wherein the training algorithm is configured with the one or more optimized configuration parameters.

18. The one or more non-transitory, computer-readable storage media of claim 17, wherein to optimize the recurrent neural network and the feed-forward neural network comprises to determine the one or more optimized configuration parameters to minimize training time to achieve a predetermined accuracy level.

19. The one or more non-transitory, computer-readable storage media of claim 17, further comprising a plurality of instructions that in response to being executed cause the computing device to train the machine learning network with a plurality of parallel instances of the training algorithm, wherein each parallel instance of the training algorithm is configured with a different set of one or more configuration parameters.

20. The one or more non-transitory, computer-readable storage media of claim 19, further comprising a plurality of instructions that in response to being executed cause the computing device to capture a time series of partial accuracy values for each parallel instance of the training algorithm.

21. The one or more non-transitory, computer-readable storage media of claim 17, further comprising a plurality of instructions that in response to being executed cause the computing device to train the machine learning network with the training algorithm in parallel by a plurality of distributed computing nodes, wherein the training algorithm of each computing node is configured with a different set of one or more configuration parameters.

22. The one or more non-transitory, computer-readable storage media of claim 17, further comprising a plurality of instructions that in response to being executed cause the computing device to capture a time series of partial accuracy values in response to training the machine learning network with the training algorithm configured with the one or more optimized configuration parameters.

* * * * *